United States Patent [19]

Hendi et al.

[11] Patent Number: 5,618,343
[45] Date of Patent: Apr. 8, 1997

[54] PIGMENT COMPOSITIONS FOR COATINGS

[75] Inventors: Shivakumar B. Hendi, Newark; Edward E. Jaffe, Wilmington, both of Del.

[73] Assignee: Ciba-Geigy Corporation, Tarrytown, N.Y.

[21] Appl. No.: 364,345

[22] Filed: Dec. 27, 1994

[51] Int. Cl.$^6$ .................................. C08K 5/00
[52] U.S. Cl. .................. 106/498; 106/404; 106/410; 106/411; 106/413; 106/415; 106/417; 106/418; 106/472; 106/494; 106/495; 106/497; 546/49; 546/56
[58] Field of Search .................. 106/410, 411, 106/413, 494, 495, 497, 498, 404, 415, 417, 418, 472; 546/49, 56

[56] References Cited

U.S. PATENT DOCUMENTS

Re. 35,009  8/1995  Bugnon et al. ................ 548/453
5,084,573  1/1992  Babler et al. ................... 546/56
5,298,076  3/1994  Babler ............................ 106/493
5,334,727  8/1994  Campbell ..................... 548/373.1
5,362,780  11/1994  Bäbler et al. .................. 524/88

*Primary Examiner*—Mark L. Bell
*Assistant Examiner*—Scott L. Hertzog
*Attorney, Agent, or Firm*—George R. Dohmann

[57] ABSTRACT

The present invention relates to pigment and coating compositions that are used to prepare pigmented coatings that exhibit geometric metamerism or metallic flop. The pigment compositions comprise a small particle size pigment and a flop-enhancing agent, which flop-enhancing agent is a copper phthalocyanine, an indanthrone or a carbazole dioxazine compound. A method of enhancing the flop of a pigmented polymeric coating by incorporating one or more flop-enhancing agents into the composition is also disclosed.

22 Claims, No Drawings

PIGMENT COMPOSITIONS FOR COATINGS

The invention relates to pigment compositions which are useful for preparing polymeric coatings having a metallic flop.

BACKGROUND

The present invention relates to pigment compositions and coating compositions that are used to prepare pigmented coatings that exhibit geometric metamerism or metallic flop, wherein the hue of the coating changes based on the viewing angle of the observer. The invention is based on the general discovery that the flop of a pigmented coating is greatly enhanced if it is colored with a pigment composition that contains a small particle size pigment that is treated with a small mount of a copper phthalocyanine, indanthrone or carbazole dioxazine compound which acts as a flop-enhancing agent.

The use of small particle size pigments as transparent pigments in coating compositions is well-known in the art. Coating compositions containing transparent pigments are useful for automotive and industrial finishes.

Copper phthalocyanine, indanthrone and carbazole dioxazine compounds are also well-known in the art, primarily as pigments or as dyes. However, their use as flop-enhancing agents has not previously been reported.

U.S. Pat. No. 5,362,780 describes pigment compositions containing a 2,9-dichloroquinacridone and a blue-colored copper phthalocyanine sulfonic acid or indanthrone sulfonic acid. The copper phthalocyanine and indanthrone sulfonic acids are utilized to adjust the color of the magenta 2,9-dichloroquinacridone pigment in order to obtain a heat-stable violet pigment which is used for coloring engineering plastics. The compositions in the '780 patent are not utilized in coating compositions, and there is no suggestion that the copper phthalocyanine and indanthrone sulfonic acids could enhance the flop of pigmented coatings.

According to the present invention, a pigment composition containing a small particle size pigment and a flop-enhancing agent is utilized to pigment a coating composition. The pigmented coatings prepared from such coating compositions exhibit a high degree of flop which represents an improvement in the art and which permits access to new color space regions.

DETAILED DESCRIPTION

The present invention relates to a pigment composition, which comprises a small particle size pigment and a flop-enhancing agent, which flop-enhancing agent is a copper phthalocyanine, an indanthrone or a carbazole dioxazine compound. The present invention further relates to coating compositions which are pigmented with a tinctorally effective amount of a pigment composition which comprises a small particle size pigment and a flop-enhancing agent. The invention also relates to method of enhancing the flop of a pigmented coating by incorporating one or more flop-enhancing agents into the composition.

The expression "flop" is used to describe a phenomenon whereby different hues are observed from different viewing angles.

The flop-enhancing agent utilized in the present compositions are copper phthalocyanine, indanthrone and carbazole dioxazine compounds; including derivatives thereof, especially sulfonic acids, sulfonic acid salts, sulfonamide derivatives and alkylamino derivatives thereof, especially monosulfonic acids and the corresponding salts.

Particularly suitable copper phthalocyanine compounds are of the formula

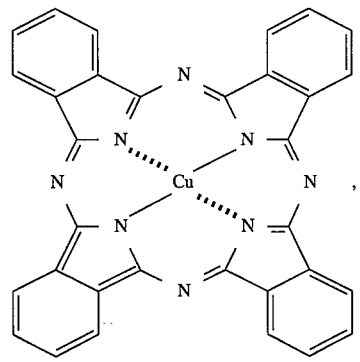

wherein the phenyl rings are unsubstituted or substituted by one or more substituents selected from the group consisting of halogen, —$SO_3M$, —$SO_2$—$NR_1R_2$, $C_1$–$C_6$alkyl and —X—$NR_1R_2$, wherein M is hydrogen, ammonium or a metal, $R_1$ and $R_2$ are independently hydrogen, $C_1$–$C_6$alkyl or —X—$NR_1R_2$, and X is a $C_1$–$C_6$ alkylene, which $C_1$–$C_6$alkyl and $C_1$–$C_6$ alkylene groups are unsubstituted or further substituted by $C_1$–$C_4$alkyl. Preferably M is hydrogen, aluminum, an alkali metal or an alkaline earth metal, for example, sodium, potassium, calcium, barium, or magnesium.

Preferably, the phenyl rings are unsubstituted or substituted by 1 to 4 substituents. Most preferably the phenyl rings are unsubstituted or substituted by one substituent.

Preferred copper phthalocyanine flop-enhancing agents include unsubstituted copper phthalocyanine and copper phthalocyanine which is substituted by —$SO_3H$, —$SO_3M$, —$CH_2N(CH_3)_2$ and —$SO_2$—$NHCH_2CH_2CH_2N(CH_3)_2$. Preferably, the copper phthalocyanine is unsubstituted or monosubstituted by —$SO_3H$, —$SO_3M$, —$CH_2N(CH_3)_2$ and —$SO_2$—$NHCH_2CH_2CH_2N$ $(CH_3)_2$.

Particularly suitable indanthrone compounds include compounds of the formula

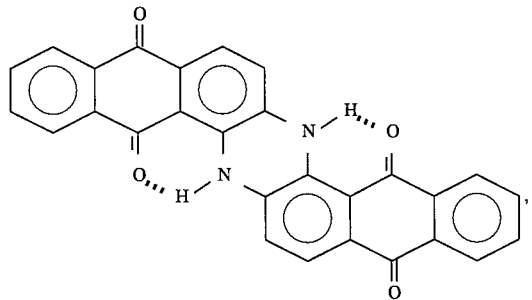

wherein the phenyl rings are unsubstituted or substituted by one or more substituents selected from the group consisting of halogen, —$SO_3M$, —$SO_2$—$NR_1R_2$, $C_1$–$C_6$alkyl and —X—$NR_1R_2$, wherein M is hydrogen, ammonium or a metal, $R_1$ and $R_2$ are independently hydrogen, $C_1$–$C_6$alkyl or —X—$NR_1R_2$, and X is a $C_1$–$C_6$ alkylene, which $C_1$–$C_6$alkyl and $C_1$–$C_6$ alkylene groups unsubstituted or further substituted by $C_1$–$C_4$alkyl. Preferably M is hydrogen, aluminum, an alkali metal or an alkaline earth metal, for example sodium, potassium, calcium, barium, or magnesium.

Preferably, the phenyl rings are unsubstituted or substituted by 1 to 4 substituents. Most preferably the phenyl rings are unsubstituted or substituted by one or two substituents.

Preferred indanthrone flop-enhancing agents include unsubstituted indanthrone and indanthrone which is mono- or di-substituted by —SO₃H, —SO₃M, —CH₂N(CH₃)₂ and —SO₂—NHCH₂CH₂CH₂N(CH₃)₂. Preferably, the indanthrone is unsubstituted or monosubstituted by —SO₃H, —SO₃M, —CH₂N(CH₃)₂ and —SO₂—NHCH₂CH₂CH₂N(CH₃)₂.

Particularly suitable carbazole dioxazine compounds include C.I. Pigment Violet 23 and its derivatives. The carbazole dioxazine compounds are believed to be compounds of the formula

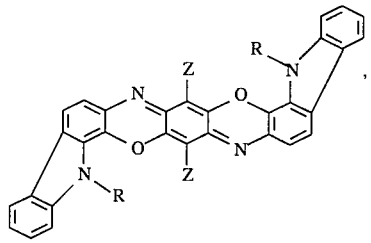

wherein each R is independently hydrogen or $C_1$–$C_6$alkyl, especially wherein each R is ethyl, Z is hydrogen or halogen, especially wherein each Z is halogen, especially chlorine, and the phenyl rings are unsubstituted or substituted by one or more substituents selected from the group consisting of halogen, —SO₃M, —SO₂—NR₁R₂, $C_1$–$C_6$alkyl and —X—NR₁R₂, wherein M is hydrogen, ammonium or a metal, R₁ and R₂ are independently hydrogen, $C_1$–$C_6$alkyl or —X—NR₁R₂, and X is a $C_1$–$C_6$ alkylene, which $C_1$–$C_6$alkyl and $C_1$–$C_6$ alkylene groups are unsubstituted or further substituted by $C_1$–$C_4$alkyl. Preferably M is hydrogen, aluminum, an alkali metal or an alkaline earth metal, for example sodium, potassium, calcium, barium, or magnesium.

The phenyl rings are unsubstituted or substituted by 1 to 2 substituents. Most preferably the phenyl rings are unsubstituted or substituted by one substituent.

Preferred carbazole dioxazine flop-enhancing agents include unsubstituted carbazole dioxazine and carbazole dioxazine which is substituted by —SO₃H, —SO₃M, —CH₂N(CH₃)₂ and —SO₂—NHCH₂CH₂CH₂N(CH₃)₂. Preferably, the carbazole dioxazine is unsubstituted or monosubstituted by —SO₃H, —SO₃M, —CH₂N(CH₃)₂ and —SO₂—NHCH₂CH₂CH₂N(CH₃)₂.

The above described unsubstituted copper phthalocyanine, indanthrone and carbazole dioxazine compounds are commercially available and are prepared by methods known in the art. Some of the above-described substituted compounds are also commercially available, for example, the sulfonated derivatives. The other above-described substituted compounds are prepared from the unsubstituted compound by methods familiar to the organic chemist, for example, standard sulfonation, sulfonyl chloride formation and alkylation techniques.

The small particle size pigment is any pigment having a specific surface area in the range from 40 to 100 m²/gram. Preferably, the small particle size pigment is a pigment having a specific surface area in the range from 50 to 90 m²/gram, in particular from 50 to 90 m²/gram. Pigments having a specific surface area within any of the above-described ranges are referred to as particle size optimized pigments throughout this application. The surface area is measured by any acceptable method, preferably the BET method.

In general, pigments having a surface area within the above-indicated ranges are referred to as transparent pigments due to their lack of light scattering.

Highly saturated, small particle size pigments are preferred for metallized automotive coatings.

Preferably, the small particle size pigment is a 1,4-diketo-3,6-diaryl-pyrrolo[3,4-c]pyrrole (DPP) pigment, quinacridone pigment, a quinacridonequinone pigment or a solid solution pigment. Preferred solid solution pigments are those which contain one or more DPP, quinacridone and/or quinacridonequinone components.

Suitable DPP pigments are well-known in the art. Such suitable DPP pigments include particle size optimized compounds of the formula (I) or (II)

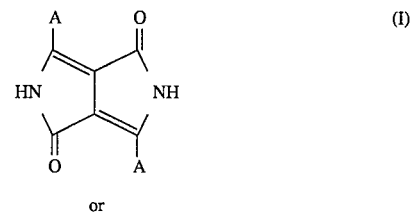

or

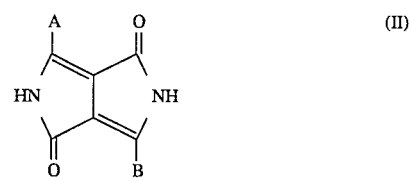

in which A and B are independently of each other a group of the formula

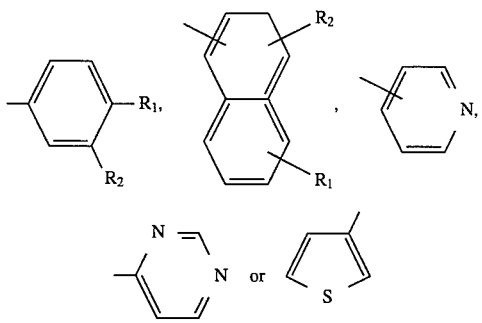

in which R₁ and R₂ are independently of each other hydrogen, halogen, $C_1$–$C_5$-alkyl, $C_1$–$C_5$-alkoxy, —SR₃, —N(R₃)₂, —CF₃, —CN or a group of the formula

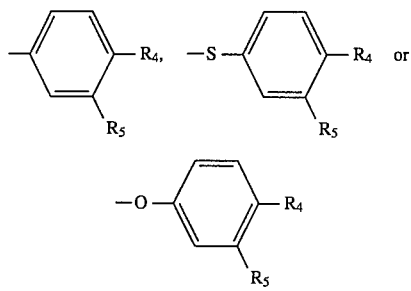

R₃ is $C_1$–$C_5$-alkyl and R₄ and R₅ are independently of each other hydrogen, halogen, $C_1$–$C_5$alkyl, $C_1$–$C_5$-alkoxy, —SR₃ or —CN.

Preferred diaryldiketopyrrolo[3,4-c]pyrroles are compounds of the Formula I in which both A substituents are identical groups of the formula

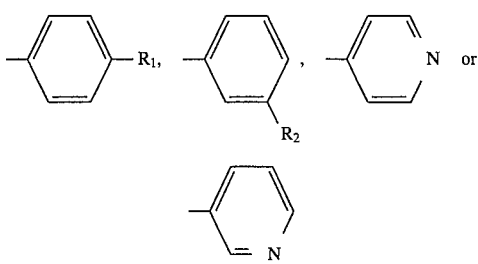

in which $R_1$ is hydrogen, chlorine, bromine, cyano, methyl, ethyl, tert.-butyl or phenyl and $R_2$ is hydrogen, chlorine, methyl, or cyano.

Preferred DPP pigments include particle size optimized diphenyl-DPP, di(4-chlorophenyl)-DPP, di(4-tert-butylphenyl)-DPP, di(3-cyanophenyl)-DPP, di(4-cyanophenyl)-DPP, di(biphenyl-1-yl)-DPP, di(4-methylphenyl)-DPP and di(3,4-dichlorophenyl)-DPP.

Suitable quinacridone pigments are known in the art. Such suitable quinacridone pigments include particle size optimized linear quinacridone compounds of the formula

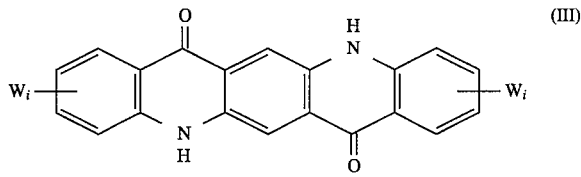

in which each W is independently halogen, $C_1$–$C_5$ alkyl or $C_1$–$C_5$ alkoxy and i is zero, 1 or 2.

Especially suitable quinacridone pigments include particle size optimized unsubstituted quinacridone, such as β-quinacridone, γ-quinacridone, 2,9-dichloroquinacridone and 2,9-dimethylquinacridone.

Suitable quinacridonequinone pigments are known in the art. Such quinacridonequinone pigments include particle size optimized compounds of the formula

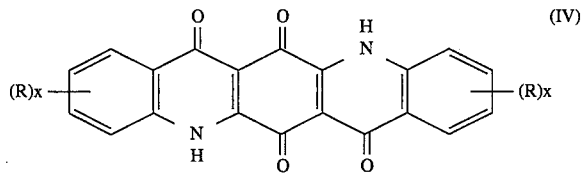

in which R is hydrogen, halogen, or $C_1$–$C_4$ alkyl, and x is zero, 1 or 2.

Especially suitable quinacridonequinone pigments include particle size optimized unsubstituted quinacridonequinone, 2,9-dichloroquinacridonequinone and 2,9-dimethylquinacridonequinone.

Particle size optimized solid solution pigments are also suitable as the small particle size pigment of the present compositions. Any solid solution pigment with the proper particle size and sufficient saturation is suitable as the small particle size pigment. Particularly, suitable solid solution pigments are those which contain a DPP, quinacridone or quinacridonequinone as a component of the solid solution. In particular, suitable solid solution pigments include particle size optimized pigments of the type described in U.S. Pat. Nos. 4,286,998, 4,810,304, 4,783,540, and in U.S. patent application Ser. Nos. 08/122,025, 08/289,167, 08/314,018, and 08/312,493, which are here incorporated by reference.

Particularly suitable solid solution pigments include particle size optimized 2,9-dichloroquinacridone/di(4-chlorophenyl)-DPP and 2,9-dichloroquinacridone/unsubstituted DPP/di(4-chlorophenyl)-DPP solid solutions.

In general, the pigment compositions are prepared by methods known in the art, for example by conventional wet blending techniques. Preferably, a slurry containing the small-particle-size pigment and the flop-enhancing agent is mixed until homogeneous. The pigment composition is then isolated by filtering the slurry.

The present pigment compositions contain from 0.1 to 10 percent by weight, based on the weight of the composition, of the flop-enhancing agent. Preferably, the pigment compositions contain from 2 to 6 percent by weight of the flop-enhancing agent. Most preferably, the pigment compositions contain 3 to 5 percent by weight of the flop-enhancing agent.

In addition to the small particle size pigment and the flop-enhancing agent, the present pigment compositions advantageously also contain customary additives.

In particular, the present pigment compositions contain a rheology improving agents in addition to the small particle size pigment and the flop-enhancing agent. Such rheology improving agents are known in the art and include pyrazolylmethyl-substituted quinacridones, pyrazolylmethyl-substituted-DPPs, quinacridone sulfonic acids and/or their salts, DPP sulfonic acids and/or their salts, N,N-dialkylquinacridonesulfonamides, phthalimidomethylquinacridones, phthalimidomethyl DPPs and mixtures thereof. Suitable rheology improving agents include pyrazolylmethylquinacridone, aluminum quinacridone monosulfonate and mixtures thereof.

In general, the present pigment compositions contain from 0 to 10 percent by weight of the rheology improving agent, based on the weight of the pigment composition. Preferably, the pigment compositions contain from 2 to 6 percent by weight of the rheology improving agent. Especially preferred pigment compositions contain from 3 to 5 percent by weight of the rheology improving agent.

The present pigment compositions are useful for preparing transparent coatings, in particular, industrial coatings and automotive finishes. Generally, an effective pigmenting amount of the pigment composition is incorporated into the coating composition to be pigmented, in particular by ball-milling and attritor grinding techniques. An effective pigmenting amount is any amount suitable to provide the desired color in the coating composition. In particular, the pigment compositions are used in an amount of 0.01 to 30% by weight, preferably 0.1 to 10% by weight, based on the weight of the coating composition to be pigmented.

Although it is preferred to pigment the coating composition with a pigment composition described above, pigmented coating compositions of the present invention are also prepared by incorporating the small particle size pigment and the flop-enhancing agent into the coating composition separately. If the small particle size pigment and flop-enhancing agent are incorporated into the coating composition separately, it is preferred to add them to the coating composition in slurry form.

In general, the coating compositions which are colored according to the present process contain a high-molecular-weight organic material which is, for example, a cellulose ether, a cellulose ester, a polyurethane, a polyesters, a polycarbonate, a polyolefin, a polystyrene, a polysulfone, a polyamide, a polycycloamide, a polyimide, a polyether, a polyether ketone, a polyvinyl halide, a polytetrafluoroethylene, an acrylic or methacrylic polymer, a rubber, a silicone polymer, a phenol/formaldehyde resin, melamine, a formaldehyde resin, a urea/formaldehyde resin, an epoxy resin, a diene rubbers or copolymers thereof.

Heat-curable coatings or cross-linking, chemically-reactive coatings, are also colored according to the present process. Examples of the pigmented, high-molecular-weight organic materials which are used in coatings include acrylic, alkyd, epoxy, phenolic, melamine, urea, polyester, polyurethane, blocked isocyanate, benzoguanamine or cellulose ester resins, or combinations thereof. The pigmented coating compositions prepared according to the present process are also useful as air-drying or physically-drying coatings, for example, conventional lacquers such as those used in the cosmetics industry as nail varnishes, for example nitrocellulose lacquers.

The present process is particularly suitable for preparing industrial coatings and those conventionally employed in the automobile industry, especially in thermosetting resins such as acrylic/melamine resin, alkyd/melamine resin or thermoplastic acrylic resin systems, as well as in aqueous-based coating systems. The present pigment compositions are especially suitable for coloring solvent-borne and water-borne automotive finishes.

The present pigment compositions are especially useful in effect pigments, such as coated and uncoated micas, aluminum flakes and graphite flakes. Objects coated with a coating composition, which utilizes an effect pigment containing a pigment composition of the present invention, show a unique "flop" effect wherein a different color is observed when the object is viewed from different angles. Such a flop effect is often highly desirable in automotive finishes.

Depending on the end use, it can be advantageous to add specific amounts of texture improving agents to the pigment. Suitable texture improving agents are, in particular, fatty acids of not less than 18 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecane-1,2-diol, and also modified colophonium/-maleate resins or fumaric acid/colophonium resins or polymeric dispersants. The texture improving agents are preferably added in amount of 0.1 to 30%, by weight, most preferably 2 to 15% by weight, based on the final product.

The following examples further describe but do not limit the invention. All parts and percentages are by weight unless otherwise specified.

EXAMPLE 1

(a) 4.0 grams of di(4-chlorophenyl)-DPP, 6.0 grams of 2,9-dichloroquinacridone, 1.0 grams of dimethyl glutarate, 0.5 grams of surfactant and 40 grams of hydrated aluminum sulfate are combined in a 1000 ml ball mill containing steel balls and nails as grinding media. The ball mill is then rolled for about 24 hours. The contents are then discharged and separated from the milling media to yield a mill powder. The mill powder is stirred with 500 ml of 2 percent sulfuric acid at 90° C. for 2 hours. The resulting pigment slurry was then filtered and then washed with hot water until neutral and free of salts to yield a small particle size solid solution pigment presscake.

(b) A mixture containing 99 parts of the above prepared presscake and 1.0 part of copper phthalocyanine monosulfonic acid, the pans being based on dry weights, is slurried in water and mixed until homogeneous. The resulting pigment slurry is filtered, dried and pulverized to yield a pigment composition of the present invention.

(c) 16.5 grams of the inventive pigment composition prepared above is combined with 41.2 grams of polyurethane resin, 9.0 grams of a dispersant resin and 98.3 grams of a solvent thinner in a pint jar. The mixture is milled for 64 hours with 980 grams of milling media to yield a pigment base containing 10 percent pigment and 30 percent solids at a binder ratio of 0.5.

EXAMPLE 2

(a) A mixture containing 91.0 pans of the presscake prepared according to Example 1(a), 4.0 pans of pyrazolylmethyl quinacridone and 4.0 parts of the aluminum salt of quinacridone monosulfonic acid, the parts being based on dry weights, is slurried in water and mixed with a slurry containing 1.0 parts of copper phthalocyanine monosulfonic acid. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 3

(a) A mixture containing 90.0 parts of the presscake prepared according to Example 1(a), 4.0 parts of pyrazolylmethyl quinacridone and 4.0 parts of the aluminum salt of quinacridone monosulfonic acid, the parts being based on dry weights, is slurried in water and mixed with a slurry containing 2.0 parts of indanthrone monosulfonic acid. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 4

(a) A mixture containing 89.0 parts of the presscake prepared according to Example 1(a), 4.0 parts of pyrazolylmethyl quinacridone and 4.0 parts of the aluminum salt of quinacridone monosulfonic acid, the parts being based on dry weights, is slurried in water and mixed with a slurry containing 3.0 parts of copper phthalocyanine monosulfonic acid. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 5

(a) A mixture containing 90.0 parts of the presscake prepared according to Example 1(a), 4.0 parts of pyrazolylmethyl quinacridone and 4.0 parts of the aluminum salt of quinacridone monosulfonic acid, the parts being based on dry weights, is slurried in water and mixed with a slurry containing 2.0 parts of unchlorinated copper phthalocyanine. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 6

(a) A mixture containing 91.0 parts of the presscake prepared according to Example 1(a), 4.0 parts of pyrazolylmethyl quinacridone and 4.0 parts of the aluminum salt of quinacridone monosulfonic acid, the parts being based on dry weights, is slurried in water and mixed with a slurry containing 1.0 parts of phthalimidomethyl copper phthalocyanine. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 7

(a) A mixture containing 89.0 parts of the presscake prepared according to Example 1(a), 4.0 parts of pyrazolylmethyl quinacridone and 4.0 parts of the aluminum salt of quinacridone monosulfonic acid, the parts being based on dry weights, is slurried in water and mixed with a slurry containing 3.0 parts of N-(3-dimethylaminopropyl) copper phthalocyanine monosulfonamide. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 8

(a) A mixture containing 89.0 parts of the presscake prepared according to Example 1(a), 4.0 parts of pyrazolylmethyl quinacridone and 4.0 parts of the aluminum salt of quinacridone monosulfonic acid, the parts being based on dry weights, is slurried in water and mixed with a slurry containing 3.0 parts of dimethylaminomethyl copper phthalocyanine. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 9

(a) A mixture containing 90.0 parts of the presscake prepared according to Example 1(a), 4.0 parts of pyrazolylmethyl quinacridone and 4.0 parts of the aluminum salt of quinacridone monosulfonic acid, the parts being based on dry weights, is slurried in water and mixed with a slurry containing 2.0 parts of copper phthalocyanine monosulfonic acid. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 10

(a) 10.0 grams of di(biphenyl-1-yl)-DPP, 1.0 grams of dimethyl glutarate, 0.5 grams of surfactant and 40 grams of hydrated aluminum sulfate are combined in a 1000 ml ball mill containing steel balls and nails as grinding media. The ball mill is then rolled for about 24 hours. The contents are then discharged and separated from the milling media to yield a mill powder. The mill powder is stirred with 500 ml of 2 percent sulfuric acid at 90° C. for 2 hours. The resulting pigment slurry was then filtered and then washed with hot water until neutral and free of salts to yield a small particle size pigment presscake.

(b) A mixture containing 95.0 parts of the presscake prepared according to Example 10(a) and 4.0 parts of pyrazolylmethyl quinacridone, the parts being based on dry weights, is slurried in water and mixed with a slurry containing 1.0 parts of copper phthalocyanine monosulfonic acid. The resulting pigment slurry is filtered, dried and pulverized to yield a pigment composition of the present invention.

(c) A pigment base is prepared using the inventive pigment composition of step (a) by following the procedure described in Example 1(c).

EXAMPLE 11

(a) A mixture containing 94.0 parts of the presscake prepared according to Example 10(a) and 4.0 parts of pyrazolylmethyl quinacridone, the parts being based on dry weights, is slurried in water and mixed with a slurry containing 2.0 parts of copper phthalocyanine monosulfonic acid. The resulting pigment slurry is filtered, dried and pulverized to yield a pigment composition of the present invention.

(b) A pigment base is prepared using the inventive pigment composition of step (a) by following the procedure described in Example 1(c).

EXAMPLE 12

(a) 2.5 grams of unsubstituted quinacridone, 7.5 grams of 2,9-dichloroquinacridone, 1.0 grams of dimethyl glutarate, 0.5 grams of surfactant and 40 grams of hydrated aluminum sulfate are combined in a 1000 ml ball mill containing steel balls and nails as grinding media. The ball mill is then rolled for about 24 hours. The contents are then discharged and separated from the milling media to yield a mill powder. The mill powder is stirred with 500 ml of 2 percent sulfuric acid at 90° C. for 2 hours. The resulting pigment slurry was then filtered and then washed with hot water until neutral and free of salts to yield a small particle size solid solution pigment presscake.

(b) A mixture containing 90.0 parts of the presscake prepared according to Example 12(a), 4.0 parts of aluminum quinacridone monosulfonate and 4.0 parts of pyrazolylmethyl quinacridone, the parts being based on dry weights, is slurried in water and mixed with a slurry containing 2.0 parts of copper phthalocyanine monosulfonic acid. The resulting pigment slurry is filtered, dried and pulverized to yield a pigment composition of the present invention.

(c) A pigment base is prepared using the inventive pigment composition of step (a) by following the procedure described in Example 1(c).

EXAMPLE 13

(a) 3.2 grams of unsubstituted DPP, 2.0 grams of 2,9-dichloroquinacridone, 4.8 grams of di(4-chlorophenyl) DPP, 1.0 grams of dimethyl glutarate, 0.5 grams of surfactant and 40 grams of hydrated aluminum surface are combined in a 1000 ml ball mill containing steel balls and nails as grinding media. The ball mill is then rolled for about 24 hours. The contents are then discharged and separated from the milling media to yield a mill powder. The mill powder is stirred with 500 ml of 2 percent sulfuric acid at 90° C. for 2 hours. The resulting pigment slurry was then filtered and then washed with hot water until neutral and free of salts to yield a small particle size solid solution pigment presscake.

(b) A mixture containing 90.0 parts of the presscake prepared according to Example 14(a), 4.0 parts of aluminum quinacridone monosulfonate and 4.0 parts of pyrazolylmethyl quinacridone, the parts being based on dry weights, is slurried in water and mixed with a slurry containing 2.0 parts of copper phthalocyanine monosulfonic acid. The resulting pigment slurry is filtered, dried and pulverized to yield a pigment composition of the present invention.

(c) A pigment base is prepared using the inventive pigment composition of step (a) by following the procedure described in Example 1(c).

EXAMPLE 14

Aluminum Base:

An aluminum base is prepared by mixing 405 grams of aluminum paste with 315 grams of acrylic dispersion resin and 180 grams of acrylic resin until lump-free.

Metallic Clear Solution

A metallic clear solution is prepared by thoroughly mixing 1353 grams of a non-aqueous dispersion resin, 786.2 grams of melamine resin, 144.6 grams of xylene, 65.6 grams of a ultraviolet screener solution and 471.6 grams of acrylourethane resin in the order given. 89.0 grams of a premixed solution of acid catalyst and 90.0 grams of methanol are then added with continued mixing.

Metallic Paint Formulation:

A basecoat paint is prepared by combining 46.8 grams of the pigment base prepared in Example 1(c), 4.2 grams of aluminum base, 4.4 grams of non-aqueous dispersion resin and 44.6 grams of metallic clear solution to yield a paint composition containing 7.1 percent pigment and 54.4 parts solids with a pigment to binder ratio of 0.15.

Aluminum panels previously treated with a grey acrylic primer are sprayed with two coats of the basecoat paint to a film thickness of 15–20 microns and a dry film basis. The two sprayings are spaced by a 90 second flash at room temperature. After a flash of three minutes, two coats of an acrylic clear topcoat are applied to a thickness of 37–50 microns on a dry film basis. The panels are then dried for 10 minutes and baked at 120° C. for 30 minutes.

The coated panels exhibit a very attractive, intense color with excellent flop, high gloss and excellent distinctness of image.

EXAMPLE 15

The procedure of Example 14 is repeated replacing the pigment base of Example 1(c) with the pigment bases prepared according to Examples 2(b), 3(b), 4(b), 5(b), 6(b), 7(b), 8(b), 9(b), 10(c), 11(b), 12(c) and 13(c). In each instance, the coated panels exhibit a very attractive, intense color with excellent flop, high gloss and excellent distinctness of image. Within the series, the pigment base of Example 4 exhibits outstanding metallic flop.

EXAMPLE 16

Mica Base:

A mica base is prepared by mixing 251.1 grams of Russet mica with 315 grams of acrylic dispersion resin until lump-free.

Mica Paint Formulation:

A mica paint formulation is prepared by combining 122.4 grams of the pigment base prepared according to Example 1(c), 70.2 grams of mica base, 20.8 grams of nonaqueous dispersion resin, 30.6 grams of melamine resin, 2.6 grams of ultraviolet screener and 3.5 grams of catalyst. After shaking for 5 minutes, the final paint is prepared by diluting with xylene to a spray viscosity of 23 seconds.

Aluminum panels previously treated with a grey acrylic primer are sprayed with two coats of the basecoat paint to a film thickness of 15–20 microns and a dry film basis. The two sprayings are spaced by a 90 second flash at room temperature. After a flash of three minutes, two coats of an acrylic clear topcoat are applied to a thickness of 37–50 microns on a dry film basis. The panels are then dried for 10 minutes and baked at 120° C. for 30 minutes.

The coated panels exhibit a very attractive, intense color with excellent flop, high gloss and excellent distinctness of image.

EXAMPLE 17

The procedure of Example 16 is repeated replacing the pigment base of Example 1(c) with the pigment bases prepared according to Examples 2(b), 3(b), 4(b), 5(b), 6(b), 7(b), 8(b), 9(b), 10(c), 11 (b), 12(c) and 13(c). In each instance, the coated panels exhibit a very attractive, intense color with high gloss and excellent distinctness of image. In general, metallic flop is more pronounced than the flop observed in Examples 14 and 15. Within the series, the pigment base of Example 4 exhibits outstanding metallic flop.

EXAMPLE 18

Pigment Dispersion: 45.5 grams of the pigment of Example 5(a), 45.5 grams of acrylic resin and 259.0 grams of deionized water are combined in a 1000 ml attritor and stirred at 500 rpm for 15 to 20 hours to yield a pigment dispersion containing 13 percent pigment and 26 percent solids.

Aluminum Base:

An aluminum base is prepared by mixing 40.0 grams of aluminum paste, 10.0 grams of melamine resin and 50.0 grams of butyl cellosolve until lump-free.

Waterborne Metallic Paint Formulation:

A waterborne basecoat paint is prepared by mixing 46.3 grams of the pigment prepared above with 4.3 grams of the aluminum base and a combination of 56.7 grams of balancing clear and 45.8 grams of compensating clear, which are mixtures of acrylic and melamine resins. The formulation corresponds to a pigment to binder ratio of 0.25.

Aluminum panels previously treated with grey acrylic primer are sprayed several times with the basecoat paint to an acceptable level of hiding. After the panels are dried, clearcoat is applied in two coats and dried.

The coated panels exhibit an attractive, intense color with excellent flop, high gloss and excellent distinctness of image.

EXAMPLE 19

The procedure of Example 18 is repeated replacing the pigment composition of Example 5(a) with the pigment composition prepared according to Examples 1(a), 2(a), 3(a), 4(a), 6(a), 7(a), 8(a), 9(a), 10(a), 11 (a), 12(a) and 13(a). In each instance, the coated panels exhibit a very attractive, intense color with high gloss and excellent distinctness of image.

In addition to the embodiments described above, numerous variations of these embodiments can be made in accordance with this invention.

We claim:

1. A coating composition comprising a flop-producing amount of an effect pigment a tinctorally-effective amount of a small-particle-size pigment and an effective flop-enhancing amount of a flop-enhancing agent which is a copper phthalocyanine, indanthrone or carbazole dioxazine compound that is substituted in a phenyl ring by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen, $C_1-C_6$alkyl or $-X-NR_1R_2$, and X is a $C_1-C_6$ alkylene, which $C_1-C_6$alkyl and $C_1-C_6$ alkylene groups are unsubstituted or further substituted by $C_1-C_4$alkyl.

2. A coating composition of claim 1 wherein the flop-enhancing agent is copper phthalocyanine which is substituted in a phenyl ring by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen, $C_1-C_6$alkyl or $-X-NR_1R_2$, and X is a $C_1-C_6$ alkylene, which $C_1-C_6$alkyl and $C_1-C_6$ alkylene groups are unsubstituted or further substituted by $C_1-C_4$alkyl.

3. A coating composition of claim 1 wherein the flop-enhancing agent is indanthrone which is substituted in a phenyl ring by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen, $C_1-C_6$alkyl or $-X-NR_1R_2$, and X is a $C_1-C_6$ alkylene, which $C_1-C_6$alkyl and $C_1-C_6$ alkylene groups are unsubstituted or further substituted by $C_1-C_4$alkyl.

4. A coating composition of claim 1 wherein the flop-enhancing agent is a carbazole dioxazine wherein the phenyl rings are unsubstituted or substituted by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen, $C_1-C_6$alkyl or $-X-NR_1R_2$, and X is a $C_1-C_6$ alkylene, which $C_1-C_6$alkyl and $C_1-C_6$ alkylene groups are unsubstituted or further substituted by $C_1-C_4$alkyl.

5. A coating composition of claim 1 wherein the flop-enhancing agent is a copper phthalocyanine, indanthrone or carbazole dioxazine compound wherein the phenyl rings are substituted by $-SO_3H$, $-SO_3M$, $-CH_2N(CH_3)_2$ or $-SO_2-NHCH_2CH_2CH_2N(CH_3)_2$.

6. A coating composition of claim 1 wherein the small-particle-size pigment is a 1,4-diketo-3,6-diaryl-pyrrolopyrrole, a quinacridone, a quinacridonequinone or a solid solution pigment.

7. A coating composition of claim 6 wherein the small-particle-size pigment is a solid solution pigment.

8. A coating composition of claim 1 wherein the small-particle-size pigment has a specific surface area within the range from 40 to 100 $m^2$/gram.

9. A coating composition of claim 8 wherein the small-particle-size pigment is selected from the group consisting of β-quinacridone, 2,9-dichloroquinacridone, 2,9-dimethylquinacridone, di(4-chlorophenyl)-DPP, di(biphenyl-1-yl)-DPP 2,9-dichloroquinacridone/di(4-chlorophenyl)-DPP solid solution and 2,9-dichloroquinacridone/unsubstituted DPP/di(4-chlorophenyl)-DPP solid solution, and the flop-enhancing agent is a copper phthalocyanine, indanthrone or carbazole dioxazine compound wherein the phenyl rings are substituted by $-SO_3H$, $-SO_3M$, $-CH_2N(CH_3)_2$ or $-SO_2-NHCH_2CH_2CH_2N(CH_3)_2$.

10. A coating composition of claim 9 wherein the small particle size pigment is 2,9-dichloroquinacridone/di(4-chlorophenyl)-DPP solid solution and the flop-enhancing agent is copper phthalocyanine monosulfonic acid.

11. A pigment composition which comprises a transparent pigment and from 0.1 to 10 percent by weight, based on the weight of the composition, of a flop-enhancing agent, which is a copper phthalocyanine, indanthrone or carbazole dioxazine compound that is substituted in a phenyl ring by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen. $C_1-C_6$alkyl or $-X-NR_1R_2$, and X is a $C_1-C_6$ alkylene, which $C_1-C_6$alkyl and $C_1-C_6$ alkylene groups are unsubstituted or further substituted by $C_1-C_4$alkyl.

12. A pigment composition of claim 11 wherein the flop-enhancing agent is copper phthalocyanine which is substituted in a phenyl ring by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen, $C_1-C_6$alkyl or $-X-NR_1R_2$, and X is a $C_1-C_6$ alkylene, which $C_1-C_6$alkyl and $C_1-C_6$ alkylene groups are unsubstituted or further substituted by $C_1-C_4$alkyl.

13. A pigment composition of claim 11 wherein the flop-enhancing agent is indanthrone which is substituted in a phenyl ring by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen, $C_1-C_6$alkyl or $-X-NR_1R_2$, and X is a $C_1-C_6$ alkylene, which $C_1-C_6$alkyl and $C_1-C_6$ alkylene groups are unsubstituted or further substituted by $C_1-C_4$alkyl.

14. A pigment composition of claim 11 wherein the flop-enhancing agent is a carbazole dioxazine wherein the phenyl rings are unsubstituted or substituted by one or more substituents selected from the group consisting of halogen, $-SO_3M$, $-SO_2-NR_1R_2$, $C_1-C_6$alkyl and $-X-NR_1R_2$, wherein M is hydrogen, ammonium or a metal, $R_1$ and $R_2$ are independently hydrogen, $C_1-C_6$alkyl or $-X-NR_1R_2$, and X is a $C_1-C_6$ alkylene, which $C_1-C_6$alkyl and $C_1-C_6$ alkylene groups are unsubstituted or further substituted $C_1C_4$alkyl.

15. A pigment composition of claim 11 wherein the flop-enhancing agent is a copper phthalocyanine, indanthrone or carbazole dioxazine compound wherein the phenyl rings are substituted by $-SO_3H$, $-SO_3M$, $-CH_2N(CH_3)_2$ or $-SO_2-NHCH_2CH_2CH_2N(CH_3)_2$.

16. A pigment composition of claim 11 wherein the transparent pigment is a 1,4-diketo-3,6-diaryl-pyrrolopyrrole, a quinacridone, a quinacridonequinone or a solid solution pigment.

17. A pigment composition of claim 11 wherein the transparent pigment is selected from the group consisting of β-quinacridone, 2,9-dimethylquinacridone, di(4-chlorophenyl)-DPP, di(biphenyl-1-yl)-DPP 2,9-dichloroquinacridone/di(4-chlorophenyl)-DPP solid solution and 2,9-dichloroquinacridone/unsubstituted DPP/di(4-chlorophenyl)-DPP solid solution, and the flop-enhancing agent is a copper phthalocyanine, indanthrone or carbazole dioxazine compound wherein the phenyl rings are substituted by $-SO_3H$, $-SO_3M$, $-CH_1N(CH_3)_2$ or $-SO_2-NHCH_2CH_2N(CH_3)_2$.

18. A pigment composition of claim 17 wherein the transparent pigment is 2,9-dichloroquinacridone/di(4-chlorophenyl)-DPP solid solution and the flop-enhancing agent is copper phthalocyanine monosulfonic acid.

19. A pigment composition of claim 18 which further comprises a rheology improving agent.

20. A pigment composition of claim 19 wherein the rheology improving agent is pyrazolylmethylquinacridone, aluminum quinacridone monosulfonate or a mixture thereof.

21. A method of enhancing the flop of a polymeric coating containing an effect pigment and a transparent pigment, which comprises incorporating a flop-enhancing agent into the polymeric coating, wherein the flop-enhancing agent is a copper phthalocyanine, indanthrone or carbazole dioxazine compound.

22. A coating composition of claim 1 wherein the effect pigment is selected from the group consisting of coated micas, uncoated micas, aluminum flakes and graphite flakes.

* * * * *